US012763868B2

(12) United States Patent
Laursen

(10) Patent No.: US 12,763,868 B2
(45) Date of Patent: Oct. 13, 2026

(54) COMPUTING NETWORK PHYSICAL LAYER DEVICE INCLUDING PORT EXPANDER, AND METHOD OF USING SAME

(71) Applicant: Intel Corporation, Santa Clara, CA (US)

(72) Inventor: Soren R. F. Laursen, Alleroed (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/957,966

(22) Filed: Sep. 30, 2022

(65) Prior Publication Data

US 2023/0023258 A1 Jan. 26, 2023

(51) Int. Cl.

*H04J 14/08* (2006.01)
*G06F 13/14* (2006.01)
*H04J 14/02* (2006.01)

(52) U.S. Cl.

CPC .............. *H04J 14/08* (2013.01); *G06F 13/14* (2013.01); *H04J 14/0209* (2013.01)

(58) Field of Classification Search

CPC ............ H04J 14/02; H04J 14/08; G06F 13/14
See application file for complete search history.

(56) References Cited

U.S. PATENT DOCUMENTS 12,137,156 B2 * 11/2024 Lyer .................. H04L 12/40013
12,191,986 B2 * 1/2025 Hu .......................... H04J 3/247
2012/0300792 A1 * 11/2012 Patel ....................... H04L 49/30 370/476
2015/0017823 A1 * 1/2015 Hori ....................... H01R 31/08 439/101
2019/0042484 A1 * 2/2019 Fornal .................. G06F 13/102

OTHER PUBLICATIONS

Synopsys, "What is SerDes (Seralizer/Deserializer)?," available online at https://www.synopsys.com/glossary/what-is-serdes.html, at least as early as Oct. 12, 2022 (6 pages).
Tianshu, Wang, "What is FlexE?," Huawei Technologies Co., available online at https://info.support.huawei.com/info-finder/encyclopedia/en/FlexE.html, (Sep. 30, 2021) (9 pages).

* cited by examiner

*Primary Examiner* — Henry Tsai
*Assistant Examiner* — Christopher A Daley
(74) *Attorney, Agent, or Firm* — Alliance IP, LLC

(57) ABSTRACT

A physical layer (PHY) device of a switch system of a computing network, a switch system including the PHY device, a tangible non-transitory machine-readable medium to perform operations at the PHY device, and a method to be performed at the PHY device. The PHY device includes a first physical input/output (I/O), and a second physical (I/O), and PHY circuitry coupled between the first I/O and the second I/O. The PHY circuitry includes one of a retimer circuitry or a switch circuitry, and is to: implement a plurality of ports at the first I/O, and a data link at the second I/O; access a plurality of data flows from the plurality of ports at the first I/O; determine a multiplexed data stream from the plurality of data flows by implementing a multiplexing algorithm; and send the multiplexed data stream for transmission from the data link at the second I/O.

25 Claims, 4 Drawing Sheets

COMPUTING NETWORK PHYSICAL LAYER DEVICE INCLUDING PORT EXPANDER, AND METHOD OF USING SAME

BACKGROUND

In computing networks such as data centers, current high speed (e.g., having speeds of about 200 GB/s or more) Ethernet switches are limited in terms of the number of serializer/deserializer (SerDes) transceivers that could be provided on a single die of the switch. This in turn can limit the number of Ethernet ports that the switch can support.

The state of the art sometimes relies on the Institute of Electrical and Electronics Engineers (IEEE) 802.1BR family of standards entitled "Virtual Bridged Local Area Networks—Bridge Port Extension," which describes manners in which data packets can be tagged to identify which logical Ethernet port they correspond to. These tagged packets are then multiplexed at the packet level and sent over a shared connection.

FlexE is another scheme whereby ports of varying speeds are multiplexed onto one or more 100 GBps links. A FlexE shim layer divides each 100G PHY in a FlexE group into 20 slots for data transmission, with each slot providing a data speed (or "speed") of 5 GBps. Ethernet frames of FlexE clients are partitioned into blocks, which are distributed to multiple PHYs of a FlexE group based on slots.

DETAILED DESCRIPTION

Figure 1:
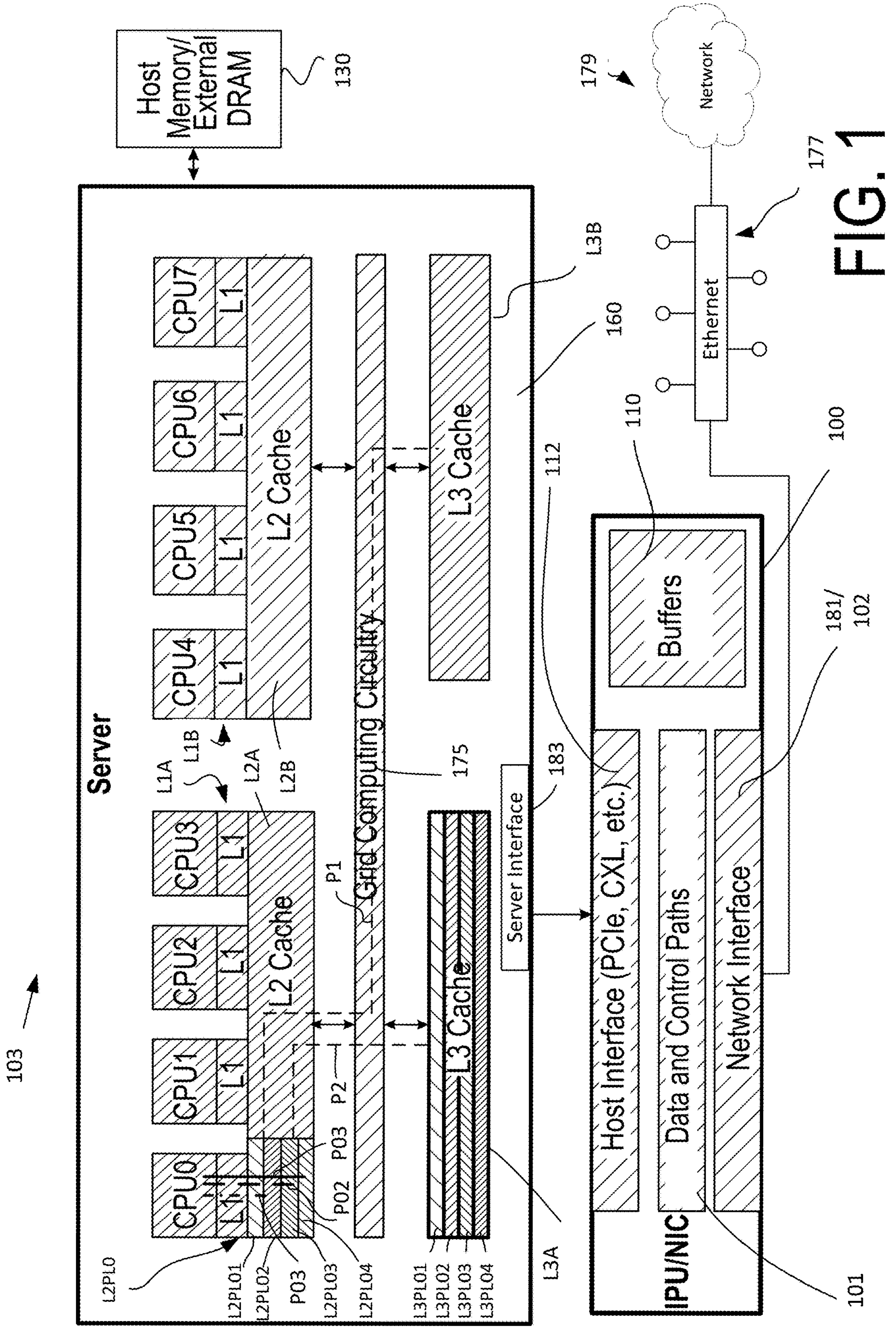
FIG. 1 depicts in schematic form an example computing system including the server of FIG. 1, coupled with a host memory and a network interface device according to an embodiment.

Some embodiments provide a mechanism to carry data traffic from multiple Ethernet ports of a PHY device over a single SerDes circuitry of the PHY device in a simple manner.

For the purposes of the present disclosure, the term "processing circuitry" refers to constructs able to process data, such as processes, threads, virtual machines, and FPGA programs.

For the purposes of the present disclosure, a computing network may include a datacenter, a content delivery network (CDN) and/or a cloud or edge network.

For purposes of the present disclosure, a "port" may include a logical port or a physical port, and/or a physical port that can support one or more logical ports.

According to some embodiments, a data packet may include information to allow a device to implement a port. Such information may include proprietary metadata indicating a port, where the metadata may include a header or a special symbol, by way of example only.

For the purposes of this disclosure, a "computing unit" includes any physical component, or logical arrangement of physical components, capable of processing some or all of a network packet. Example computing units include, but are not limited to a CPU, a core, a CPU complex, a server complex, a field programmable gate array (FPGA), an ASIC, a graphics processing unit (GPU), or other co-processors.

A "memory circuitry" as used herein, used in the context of a server architecture includes a memory structure which may include at least one of a buffer, a cache (such as a L1, L2, L3 or other level cache including last level cache), an instruction cache, a data cache, a first in first out (FIFO) memory structure, a last in first out (LIFO) memory structure, a time sensitive/time aware memory structure, a ternary content-addressable memory (TCAM) memory structure, a register file such as a nanoPU device, a tiered memory structure, a two-level memory structure, a memory pool, or a far memory structure, to name a few.

A "switch" as used herein includes ingress logic, for example on a computing node basis to receive and queue data packets from a first computing node, and egress logic 119 to queue the data packets after processing through for transmission from the switch to second computing nodes that are the addressees for the data payloads.

A Serializer/Deserializer (SerDes) as used herein refers to a functional block that is to serialize and/or deserialize digital data, for example used in high-speed chip-to-chip communication. A SerDes implementation may include parallel-to-serial and/or serial-to-parallel data conversion, and, in addition, may include impedance matching circuitry, and clock data recovery functionality. A role of a SerDes is to minimize the number of input/output (I/O) interconnects. Distributed data processing in integrated circuits (ICs) benefit from high speed data transfer between the ICs. Parallel and serial are two options to transfer data between chips. Parallel data transfer requires multiple connections between ICs on each side, as compared to serial data transfer that only needs one pair of connections. SerDes is a building block of a physical layer (PHY) for chip-to-chip interconnect systems.

The PHY is an abstraction layer responsible for transmission and reception of data, and represents an end layer of the Open Systems Interconnection (OSI) model, just under the datalink layer, represented by a medium access control layer (MAC). According to the Institute of Electrical and Electronics Engineers (IEEE)'s 802.3 standard (IEEE 802.3), a SerDes represents Physical Medium Attachment (PMA) and Physical Medium Dependent (PMD) sublayers of a PHY, corresponding to a sub-block of the PHY responsible for interface initialization, encoding decoding, and clock alignment. In particular the PMA sublayer is to perform PMA framing, octet synchronization/detection, and scrambling/descrambling, and the PMD may correspond to a transceiver for the physical medium.

The Physical coding sublayer (PCS) as used herein is to denote a networking protocol sublayer, which may be in the Fast Ethernet, Gigabit Ethernet, and 10 Gigabit Ethernet standards. It resides at the top of PHY layer (as part of the PHY layer), and provides an interface between the PMA sublayer and the media-independent interface (MII). It is responsible for data encoding and decoding, scrambling and descrambling, alignment marker insertion and removal, block and symbol redistribution, and lane block synchronization and deskew.

A forward error correction (FEC) sublayer of the PHY is to implement an error correction technique to detect and correct errors in transmitted data without the need for retransmission. The FEC sublayer at the transmitter adds some redundant check data to the message. The receiver of the data is to then perform necessary checks based upon the additional redundant bits corresponding to the error-correcting code. If the receiver finds that the data is free from errors or can be corrected, it performs any corrections needed before removing the redundant bits and passing the message to the upper layers.

A "retimer" or "retimer chip" as used herein refers to a device, such as a mixed-signal analog/digital device, that is protocol aware and has the ability to extract the embedded clock from an incoming data packet, fully recover the data, and retransmit a fresh copy of the data in a retimed data packet using a clean clock. A retimer datapath may include a continuous time linear equalizer (CTLE), a variable gain amplifier (VGA), and a linear driver. The CTLE is used to equalize the frequency dependent loss experienced in the channel. The VGA is used to restore the amplitude of the signal. The linear driver is used to drive the channel at the correct impedance. A retimer may have input loss-of-signal threshold and output receiver (Rx) detection capability, and a squelch detector that differentially detects the presence of a communication signal on low-speed channels. In addition to the CTLE, VGA, and driver stages, a retimer may contains a clock data recovery (CDR) circuit as already suggested, a long-tail equalizer (LTE), and a decision feedback equalizer (DFE). The LTE compensates for long-term impulse response impairments, and the DFE acts as a nonlinear equalizer, suppressing the inter-signal interference (ISI) due to channel imperfections such as high-frequency losses and notches.

Hereinafter, Giga Bits per second (GBps) will be referred to as "G."

A high speed switch package typically includes, in addition to a switch device (e.g., a switch chip) a plurality of retimer devices. The retimer devices make it possible for front panel connections/ports of the switch package to be placed at a distance from the switch device. At link speeds of 100G and above, even a few centimeters across a printed circuit board (PCB) can require a data signal to be conditioned while equalizing losses, restoring signal amplitude, which functions can be implemented using retimer devices. A retimer device in the current state of the art can also include a gearbox function according to which, for example, a 100G port can use two 50G links on the line side of the retimer device (e.g., the side(s) of the retimer device including ports to be coupled via links to the corresponding switch device, for example via a front panel), and one 100G link on the host side of the retimer device (e.g., the side(s) of the retimer device including ports to be coupled via links to the switch device).

High speed switch devices in the multi-terabit range in computing networks, such as data center high speed switches, typically include a number of SerDes circuitries thereon, with each SerDes circuitry capable of communicating at a given maximum speed, such as at 100G, 200G or more. In order for such a switch device to operate at its maximum possible capacity, all SerDes circuitries of that switch device would need to operate at their maximum speed, even though some of the data streams that are to be processed by the switch device may have lower data speeds associated with the same, such as, for example 100G, 50G or 25G. Therefore, the state of the art presents a discrepancy between a data speed of a switch device (sometimes also referred to as "bandwidth") and the speed of respective data flows/data streams to be switched through the switch device. By way of example, a switch device with 64 SerDes circuitries to receive data flows from various retimer devices, the switch would include 64 corresponding MAC circuitries, with a one to one correspondence between a MAC circuitry and its SerDes circuitry. The MAC circuitry of the switch device is to communicate with host devices of the computing network.

For a given SerDes, its corresponding MAC circuitry may have a speed (maximum possible speed) that is multiple of the SerDes speed. For example, two 100G SerDes' of the switch may be coupled to a 200G MAC circuitry of the switch. In contrast, in the state of the art, a SerDes circuitry of a switch device operating at e.g., 200G can only be connected with a MAC operating at 200G (or 400G, 800G etc.), that is, a SerDes operating at 200G cannot be coupled to two MACs each operating at 100G.

As noted previously, the state of the art sometimes relies on the IEEE 802.1BR family of standards to tag data packets to logical Ethernet ports, where these tagged data packets are then multiplexed at the packet level and sent over a shared connection.

According to some embodiments, multiple data flows from respective multiple input ports of a retimer device may be multiplexed onto a same SerDes of a switch device, and split again into the multiple constituent flows within the switch device.

Some embodiments provide for N independent ports on a line side of a retimer device, individual ones of the ports having respective link speeds $X_1 \ldots X_N$, to be multiplexed and routed to a same SerDes on a switch side of the retimer device, the SerDes having a speed Y, and coupled to a link of link speed Y, the link between the retimer device and the corresponding switch device, where Y is a summation of $X_1$ through $X_N$.

For example, some embodiments provide for two independent ports on a line side of a retimer device, individual ones of the ports having a link speed of X, to be multiplexed onto a same link of link speed Y=X+X between the retimer device and the corresponding switch device. Thus, according to an embodiment, two 100 G ports on a line side of a retimer device may be multiplexed onto a single 200 G link between the retimer device and a corresponding switch device.

Advantageously, some embodiments may provide switch devices with speeds in the multi-TBps range to be realized while still allowing 100 GBps ports, such as 100 GBps logical Ethernet ports, to be used, in this manner allowing a high speed switch device to use a SerDes circuitry thereof having a speed X to carry data flows having respective speeds that are less than X, a sum of the respective speeds equaling X.

Some embodiments carry a cost in terms of chip area for PHY devices such as retimer devices to be small while allowing data traffic latency and a variability thereof to be on par with existing retimer devices.

In the following figures, like components will be referred to with like and/or the same reference numerals. Therefore, detailed description of such components may not be repeated from figure to figure.

Figure 2:
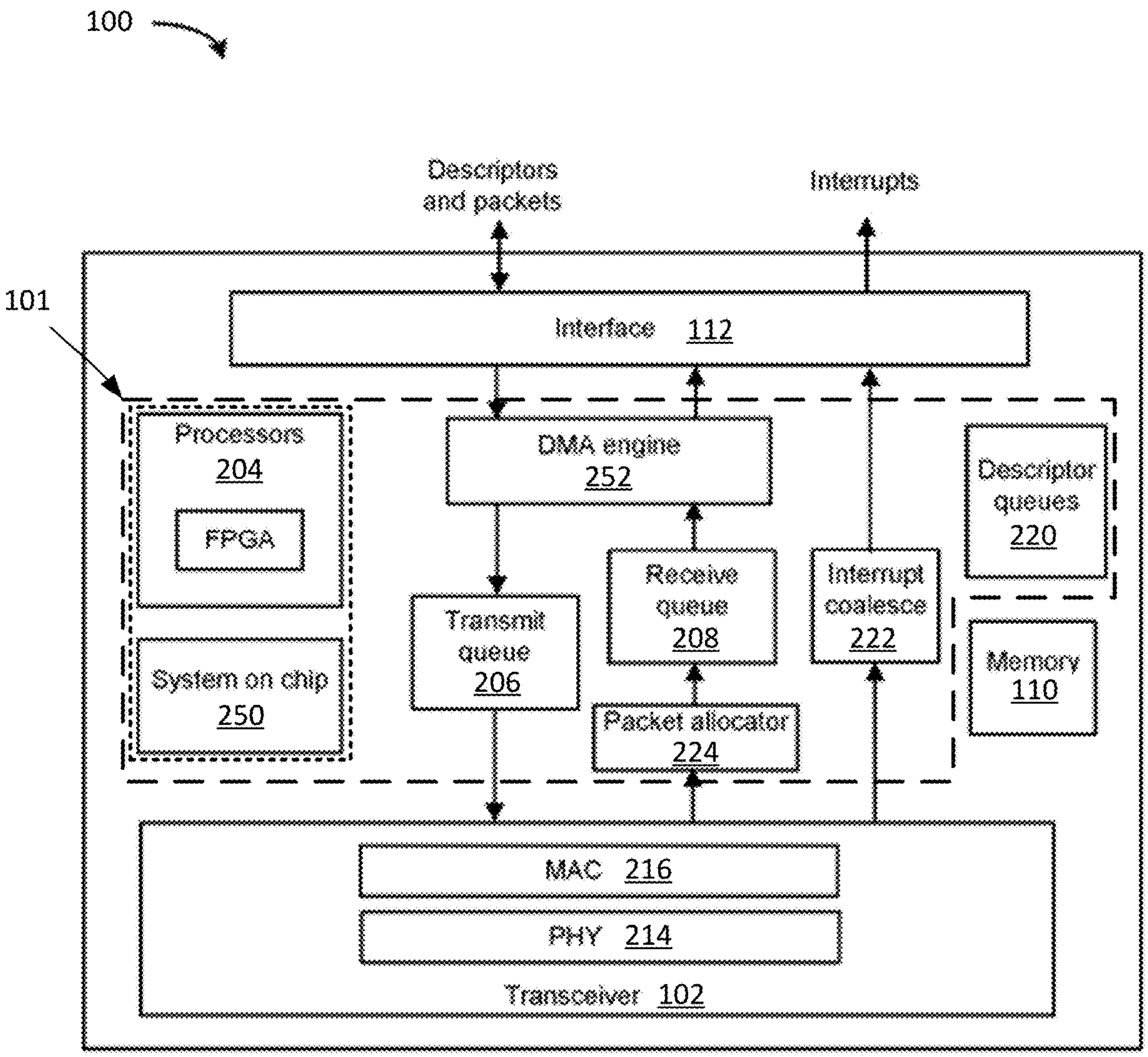
FIG. 2 depicts in schematic form an example architecture for the network interface device of FIG. 1.

FIGS. 1-2 show examples architectures relating to a computing network, such as a datacenter, according to some embodiments.

FIG. 1 shows an example computing system 103 of a datacenter. The computing system 103 includes a server architecture 160 coupled to a host memory 130 and to a network interface device 100. The network interface device may, for example, include an Infrastructure Processing Unit (IPU) or a network interface card (NIC).

Server architecture (or server)160 of computing system 103 may include two subsystems A and B of CPUs and their associated caches L1-L3. Subsystem A includes CPUs 0, 1, 2, and 3, their respective local L1 caches L1A, and their L2 cache L2A. Subsystem B includes CPUs 0, 1, 2, and 3, their respective local L1 caches L1B, and their L2 cache L2B. The L2 caches are shared by all CPUs of a subsystem in the shown example. The L3 caches L3A and L3B are also specific to each subsystem in the example of FIG. 1, although there could be a single L3 cache that is shared by all CPUs. L3 caches tend to be very large in terms of area, especially when they are shared among all subsystems of a server architecture.

The L3 cache, in the depicted example, are shown as being coupled to their respective L2 caches L2A and L2B by way of a grid computing circuitry 175 (e.g., a UNCORE (Uniform Interface to Computing Resources)).

A server architecture may include any number of subsystems with each subsystem including any number of computing units (e.g., CPUs) and any number of associated memory circuitries (e.g., caches) in any configuration. In addition, the use of a grip computing circuitry, such as a grid computing circuitry, or other similar grid computing technology is optional.

The grid computing circuitry 175 may create target system specific actions from a XML workload description (Abstract Workload Objects, AWO) received from a client of the computing system. Available grid computing circuitry services may include workload submission and workload management, file access, file transfer (both client-server and server-server), storage operations, and workflow submission and management.

The server architecture may include a network interface device interface 183 (e.g., a bus) using at least one of Peripheral Component Interconnect (PCI), PCI express (PCIe), PCIx, Universal Chiplet Interconnect Express (UCIe), Intel On-chip System Fabric (IOSF), Gen-Z, Open Coherent Accelerator Processor Interface (OpenCAPI), and/or Compute Express Link (CXL), Serial ATA, and/or USB compatible interface (although other interconnection standards may be used). Interface 183 is to couple the server architecture to the network interface device to communicate data signals and control signals therewith.

The shown network interface device 100 may include a network interface 181 which is connected to Ethernet 177. The Ethernet 177 may connect the computing system 103 to a network 179 including client devices (not shown). At the other end of the network interface device, a host interface 112 may connect the network interface device with the server architecture 160, for example using a same communication protocol as that of interface 183. Host interface 112 is to communicate with network interface device interface 183 of the server architecture. Between the network interface 181 and the host interface 112, controller 101 is to control a flow of signals within the network interface device, for example by routing data packets between the network 179 and the server 103. The controller 101 may implement, for example, a FleXible Parser (FXP), or one or more of many different other protocols (e.g., RDMA, NVMe, Encryption, etc.) as well as packet storage and decryption. In the ingress direction, controller 101 may be configured to place the data at various locations in the host memory 130.

The controller 101 may perform operations on a packet, such as encapsulate/decapsulate, encrypt/decrypt, add/remove headers, aggregate/split, schedule packets and queues, etc., perform operations relating to a state of the packet, such as save/update metadata, change internal or system configurations to handle packet processing, query/use stored metadata, query/use current or historical state of network interface device or system, request/schedule network interface device and system-level state changes (e.g., pre-load caches, load FPGA code in either on-network interface device FPGA or server architecture FPGA, or both, etc.).

A memory 110 in network interface device 200 may be used to act as a storage space set aside for storing packet queues received from the server architecture 103 or from the network 179. Memory 110 can be any type of volatile or non-volatile memory device, such as one or more buffers, and can store any queue or instructions used to program network interface of network interface device 100.

As packets are received by the controller, they may be parsed and stored in the packet buffer. The controller 101 may inspect the contents of the incoming packet using packet inspection mechanisms, for example, using a TCP Offload Engine (TOE) and corresponding features. Looking up the layers in the packet's encapsulation, the controller 101 may be adapted to determine the Source/Destination, Traffic-handling and meta-data markings, application, or even the data contents. The packet inspection does not have to be deep packet inspection. It could be as simple as looking at the source address/port number/other header information and knowing that all traffic from this source address/port number/header information needs to be processed using a particular program or processing element, and may correspond to a given workload/process/instruction to be executed.

Information obtained during the process of packet analysis may be stored in a metadata database, for example in the network interface device's memory 110. The metadata database may store various metadata about a packet or group of packets. For example, the metadata database may include a service associated with the workload corresponding to the data packet, number of received packets of certain type, a program needed to process the packet or similar packets, a virtual machine needed to process the packet or similar packets, an FPGA program to process the packet or similar packets, a statistical profile of the packet or similar packets, and the like. The metadata database may be used by the controller 101 to manage coordination, scheduling, loading, and unloading of host queues (e.g., queues including control signals and/or data signals from the host) and/or network queues (e.g., queues including control signals and/or data signals from the network). The metadata database may further be used by the controller 101 in order to manage data routing operations to route data to a selected/determined physical location of a cache in the server architecture 160.

The controller 101 may implement coordinated scheduling of host or network queues. The coordinated scheduling is in order to determine proper scheduling decisions.

FIG. 2 depicts an example network interface device according to some embodiments, such as an network interface device, similar to network interface device 100 of FIG. 1. In some examples, network interface device 100 can be implemented as a network interface controller (NIC), network interface card, a host fabric interface (HFI), or host bus adapter (HBA), and such examples can be interchangeable. Network interface device 100 can be coupled to one or more servers using a bus, PCIe, CXL, or DDR. Network interface device 100 may be embodied as part of a system-on-a-chip (SoC) that includes one or more processors, or included on a multichip package that also contains one or more processors.

Some examples of network interface device 100, similar to that of FIG. 1, may be part an IPU or data processing unit (DPU) or utilized by an network interface device or DPU. An xPU can refer at least to an network interface device, IPU, DPU, GPU, GPGPU, or other processing units (e.g., accelerator devices). An network interface device in the form of an xPU can include a network interface with one or more programmable or fixed function processors to perform offload of operations that could have been performed by a CPU. The network interface device can include one or more memory devices. In some examples, the network interface device can perform virtual switch operations, manage storage transactions (e.g., compression, cryptography, virtualization), and manage operations performed on other network interface devices, servers, or devices.

Network interface device 100 can include transceiver 102, transmit queue 206, receive queue 208, memory 110, and bus interface 112, and DMA engine circuitry 252. The DMA engine 252, transmit queue 206, receive queue 208, interrupt coalesce 222, packet allocator circuitry 224 and descriptor queues 220 may be part of a controller 101, similar to example to controller 101 of FIG. 2. If the network interface device is an xPU, it may further include a processor 204 and SoC 250 shown inside dotted lines in the figure.

A descriptor provide information on a packet, such as the source and target memory addresses of the packet and the length of the packet in memory. A descriptor, once posted to a DMA engine (e.g., DMA engine 252) of a network interface device 160, will trigger the DMA engine to generate a DMA request to fetch the packet from an external memory.

Transceiver 102 can be capable of receiving and transmitting packets in conformance with the applicable protocols such as Ethernet as described in IEEE 802.3, although other protocols may be used. Transceiver 102 can receive and transmit packets from and to a network via a network medium (not depicted). Transceiver 102 can include PHY circuitry 214 and media access control (MAC) circuitry 216. PHY circuitry 214 can include encoding and decoding circuitry (not shown) to encode and decode data packets according to applicable physical layer specifications or standards. MAC circuitry 216 can be configured to assemble data to be transmitted into packets, which include destination and source addresses along with network control information and error detection hash values.

Processors 204 can be any a combination of a: processor, core, graphics processing unit (GPU), field programmable gate array (FPGA), application specific integrated circuit (ASIC), or other programmable hardware device that allow programming of network interface of network interface device 100. For example, a "smart network interface" can provide packet processing capabilities in the network interface using processors 204.

Processors 204 can include one or more packet processing pipeline that can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines can perform one or more of: packet parsing (parser), exact match-action (e.g., small exact match (SEM) engine or a large exact match (LEM)), wildcard match-action (WCM), longest prefix match block (LPM), a hash block (e.g., receive side scaling (RSS)), a packet modifier (modifier), or traffic manager (e.g., transmit rate metering or shaping). For example, packet processing pipelines can implement access control list (ACL), or packet drops due to queue overflow.

Configuration of operation of processors 204, including its data plane, can be programmed using Programming Protocol-independent Packet Processors (P4), C, Python, Broadcom Network Programming Language (NPL), Infrastructure Programmer Development Kit (IPDK), or x86 compatible executable binaries or other executable binaries. Processors 204 and/or system on chip 250 can execute instructions to configure and utilize one or more circuitry as well as check against violation against use configurations, as described herein.

Packet allocator circuitry 224 can provide distribution of received packets for processing by multiple computing units, such as CPUs 0 to 7 of FIG. 2, or cores, and can do so using packet data allocation to various cache physical locations on the server, such as server 160 of FIG. 2. When packet allocator circuitry 224 uses RSS, packet allocator circuitry 224 can calculate a hash or make another determination based on contents of a received packet to determine which CPU or core is to process a packet. The latter provides one example of implementation regarding allocation of a packet to a CPU, but also, additionally and in a related manner, to an embodiment where the packet allocator circuitry 224 is adapted to manage data routing operations by selecting cache physical locations for the storage of packet data according to an embodiment. Packet allocator circuitry 224 could, in one embodiment, be included within processors 204, or it could be separate from it.

Interrupt coalesce circuitry 222 can perform interrupt moderation whereby network interface interrupt coalesce circuitry 222 waits for multiple packets to arrive, or for a time-out to expire, before generating an interrupt to host system to process received packet(s). Receive Segment Coalescing (RSC) can be performed by network interface of network interface device 100 whereby portions of incoming packets are combined into segments of a packet. Network interface 100 provides this coalesced packet to an application.

Direct memory access (DMA) engine circuitry 252 is configured to copy a packet header, packet payload, and/or descriptor directly from host memory to the network interface device or vice versa, instead of copying the packet information to an intermediate buffer at the host and then using another copy operation from the intermediate buffer to the destination buffer, hence the "direct" in direct memory access.

Transmit queue 206 can include data or references to data for transmission by network interface of network interface device 100. Receive queue 208 can include data or references to data that was received by network interface of network interface device 100 from a network. Descriptor queues 220 can include descriptors that reference data or packets in transmit queue 206 or receive queue 208. Bus interface 112 can provide an interface with a server For example, bus interface 112 can be compatible with at least one of Peripheral Component Interconnect (PCI), PCI express (PCIe), PCIx, Universal Chiplet Interconnect Express (UCIe), Intel On-chip System Fabric (IOSF), Gen-Z, Open Coherent Accelerator Processor Interface (OpenCAPI), and/or Compute Express Link (CXL), Serial ATA, and/or USB compatible interface (although other interconnection standards may be used).

Current state-of-the-art SerDes circuitries, for example in retimer devices or in switch devices within a computing network, typically have a link speed of about 200 GBps. In order to realize the full bandwidth, high end switch chips must operate the Serdes' at their maximum speed. 66 bit PCS symbols are transferred between the MAC and PCS layer and the 66b PCS symbols are FEC encoded before transfer over the SerDes. The receiver FEC decodes and corrects the data and recreates the 66b PCS symbols. FEC circuitries that employ Reed-Solomon encoding corresponding to RS(544, 514, 10) FECs, may be used.

However, as, for example, the 200G PC S/FEC layer is agnostic to the actual sequence of 66b PCS symbols being transferred, some embodiments propose to multiplex PCS symbols from multiple logical streams into a same PCS/FEC entity that is between two computing nodes (such as server 100 and a computing node, such as a host computing node, within network 179 of FIG. 1).

Embodiments include within their scope a PHY device of a switch system of a computing network, the PHY device to implement N ports at an input thereof, and one or more M data links at an output thereof, wherein M<N, wherein at least one of the one or more M data links is to output a multiplexed data stream therefrom, the multiplexed data stream based on a multiplexing of data flows from a corresponding plurality of the N ports, and wherein the multiplexing is based on a multiplexing algorithm configured to the PHY device.

For an individual M data link, multiplexing involves combining the data flows from the of the N ports that correspond to that individual M data link, and from the combination, forming a composite or multiplexed data stream, which is then transmitted from the PHY device through a shared medium in the form of the individual M data link. When the multiplexed data stream reaches its destination, a demultiplexer (demux) at the destination device is to split or demultiplex the multiplexed data stream back into the original component data flows and is to output them into corresponding separate lines. The demultiplexing is to be based on the multiplexing algorithm of the PHY device.

A "PHY device" as referred to herein refers to circuitry implementing functional blocks that are to determine, based on a PHY layer of the OSI model, the manner in which individual bits of a data flow are to be treated while moving through the circuitry. A PHY device according to some embodiments may include a PMD circuitry, a PMA circuitry, a FEC circuitry and a PCS circuitry. A PHY device according to some embodiments may include a SerDes circuitry, and PCS/FEC circuitry According to some embodiments, the one or more M links may, based on a direction of data flow through the PHY device, correspond to one or more respective inputs of the PHY device, and the N ports may correspond to respective outputs of the PHY device.

The PHY device according to some embodiments may include a retimer device, such as a retimer device of a switch box of a computing network. The PHY device according to some embodiments may include a switch device, such as a switch device of a switch box of a computing network.

A switch package according to some embodiments includes one or more retimer devices coupled to a switch device through communication links. The switch device, and at least one of the one or more retimer devices, including a PHY device as described above.

Example embodiments will now be described more particularly in the context of FIG. 3

Figure 3:
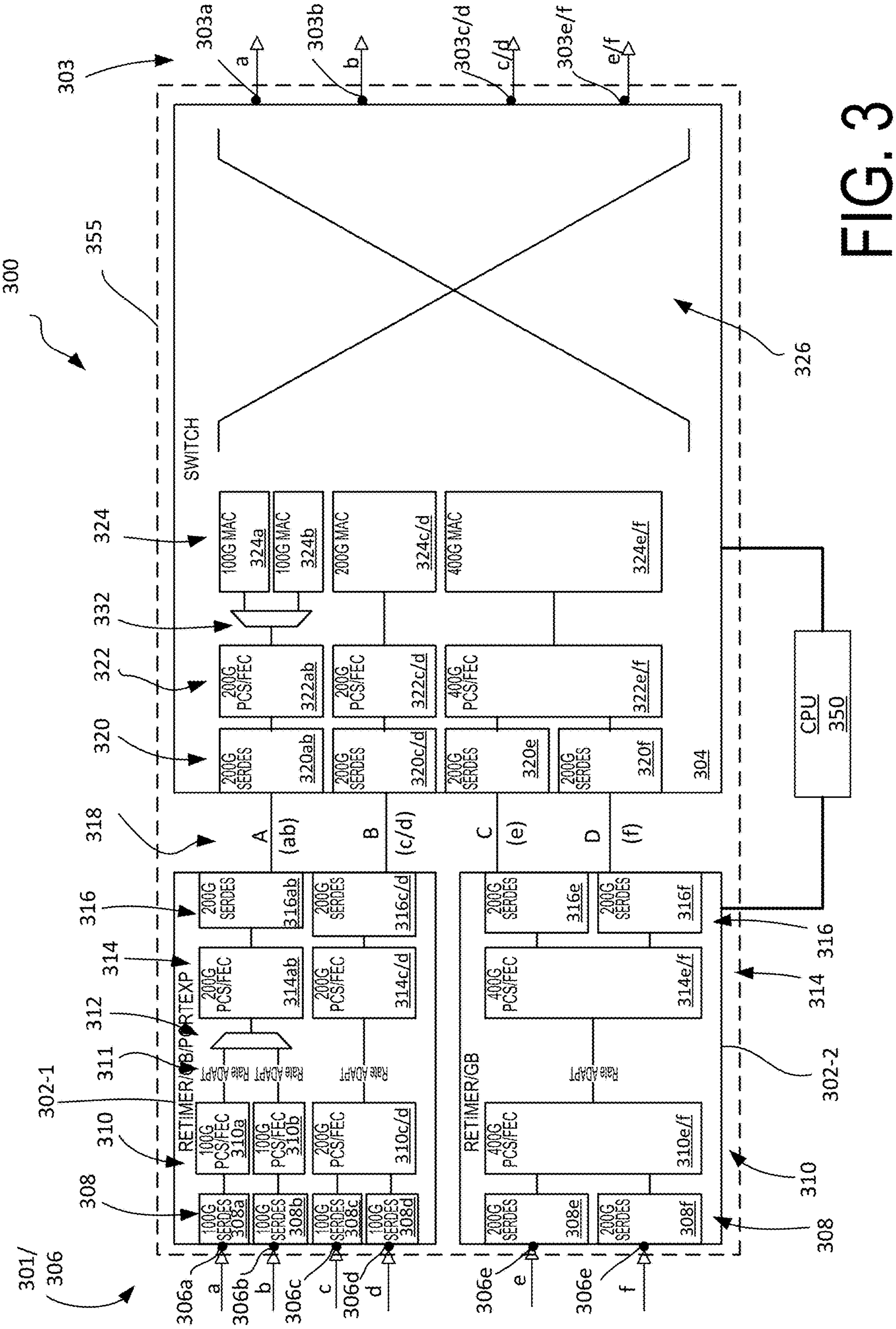
FIG. 3 depicts a computing environment according to an embodiment.

FIG. 3 shows a computing environment 300 including two retimer devices 302-1 and 302-2, and a switch device 304. The retimer devices 302-1 and 302-2, along with the switch device 304, may be provided as chips mounted on a switch package, such as a printed circuit board, PCB 355. The PCB 355 may, for example, be in a switch box of a data center. Computing environment 300 may further include a processing circuitry, such as a CPU 350, the processing circuitry to configure the switch and one or more of the retimer devices as will be explained in further detail below. The CPU may be within a same switch box, and optionally on a same switch package, as the retimer devices and the switch device.

A direction of data flow in computing environment 300 is shown as being from the line side 301 of the retimer devices toward the switch device 304, and—conceptually—out from other ports 303*a*, 303*b*, 303*c/d* and 303*e/f* on a host side 303 of the switch device 304. However, it is to be understood that the flow of data through the shown computing environment is bi-directional. Thus, data flows may flow into the switch device 304, be transmitted to retimer devices 302-1 and 302-2, for eventual transmission from the retimer devices at the line side thereof, for example through ports 306*a*-306*f*.

Individual ones of the retimer devices 302-1 and 302-2 and the switch device 304 may be embodied as one or more dies/chips. The retimer devices include ports 306 at a link side thereof. Ports 306 corresponds to input ports of the retimer devices where data is to flow from the retimer devices toward the switch for transmission through the MAC circuitries 324, such as to a plurality of host devices, and corresponds to output ports thereof where data is to flow from the switch toward the retimer devices for transmission through the retimer devices, such as to one or more NICs).

Retimer device 302-1 correspond to an embodiment of a PHY device according to one example. Retimer device 302-1 includes four ports 306*a*, 306*b*, 306*c* and 306*d*. Retimer device 302-2 corresponds to a state of the art retimer device, and includes two ports 306*e* and 306*f*. The ports may correspond to physical connections to provide access to the respective retimer devices.

Retimer device 302-1 includes, at the line side 301 thereof, 100G SerDes circuitries 308*a*, 308*b*, 308*c* and 308*d*, which respectively correspond to ports 306*a*, 306*b*, 306*c* and 306*d*. Retimer device 302-2 includes, at the line side 301 thereof, 200G SerDes circuitry 308*e* and 308*f*, which respectively correspond to ports 308*e* and 308*f*. In the shown embodiment, there is one port per SerDes circuitry 308.

The ports of the shown retimer devices may be implemented in an optical line side dock or optical line side panel a switch box that includes the retimer devices, and may be coupled to route respective data flows (one data flow per port) from optical fibers. There may be up to hundreds of ports per switch box, although only a few are shown in FIG. 3.

Retimer device 302-1 includes a line side PCS/FEC stage 310 including 100G PCS/FEC circuitries 310*a*, 310*b* and a 200G PCS/FEC circuitry 310*c/d*. Retimer device 302-1 includes a switch side PCS-FEC stage 314 including 200G PCS/FEC circuitries 314*ab* and 314*c/d*. Retimer device 302-2 includes a line side PCS/FEC stage 310 including 400G PCS/FEC circuitry 310*e/f*, and a switch side PCS-FEC stage 314 including 400G PCS/FEC circuitry 314*e/f*.

Retimer device 302-1 includes switch side 200G SerDes circuitries 316*ab* and 316*c/d*. Retimer device 302-2 includes 200G switch side SerDes circuitries 316*a*, 316*b* and 316*c/d*.

Retimer device 302-1 further includes a retimer port expander 312 to multiplex two 100G PCS flows from respective ones of PCS/FEC circuitries 310*a* and 310*b* into a single 200G PCS flow that is routed to 200G PCS/FEC 314*ab*.

Data links 318, including individual 200G links A, B, C and D, provide communicative coupling between respective SerDes circuitries 316*ab*, 316*c/d*, 316*e* and 316*f* of retimer devices 302-1 and 302-2, and respective SerDes circuitries 320*ab*, 320*c/d*, 320*e* and 320*f* of switch device 304. As shown, there is one link per SerDes circuitry both on the retimer side and on the switch side.

Switch device 304 thus includes, at a retimer side thereof, SerDes circuitries 320*ab*, 320*c/d*, 320*e* and 320*f*. Switch device further includes PCS/FEC circuitries 322*ab*, 322*c/d* and 322*e/f*, and MAC circuitries 324*a*, 324*b*, 324*c/d* and 324*e/f*. Switch device 304 may further include switching circuitry 326 to route data flows from MACs 324*a*, 324*b*, 324*c/d* and 324*e/f* for transmission to corresponding addressees of the data flows, for example to various corresponding host device of the computing network.

The MAC circuitries 324*a*, 324*b*, 324*c/d* and 324*e/f* may perform data link layer functions, for example Ethernet data link layer functions, which may include receiving transmitting data frame, appending or checking frame check sequences, and/or prepending (during transmission) and removing (during reception) preambles.

A data flow as referred to in the context of embodiments may be per port on the line side of the switch box. A data flow X as referred to in the context of embodiments may undergo various changes through various operations implemented thereon in a retimer device or in a switch device. However, for purposes of the instant description, that data flow X will consistently be referred to as "data flow X" although it may have undergone some changes as it travels through the retimer device and the switch.

As seen in FIG. 3, (PHY) device of a switch system of a computing network, such as retimer 302-1, is to implement N ports 306*a* through 306*f* (in the shown example 6 ports) at an input thereof corresponding to line side 301, and one or more M data links 318, corresponding to data links A through D (in the shown example 5 data links), at an output thereof, wherein M<N (4<6) and wherein at least one of the one or more M data links, that is, link A in the shown example, is to output a multiplexed data stream therefrom, the multiplexed data stream based on a multiplexing of data flows from a corresponding plurality of the N ports (in the shown example, a multiplexing of data flows corresponding to ports 306*a* and 306*b*).

In operation, 100G data flows a, b, c, d, and 200G data flows e and f, may be input into the respective retimer devices 302-1 and 302-2, and may be deserialized and routed to PCS/FEC circuitries 310*a*, 310*b*, 310*c/d*, and 310*e/f* (collectively PCS/FEC circuitries 310). PCS/FEC circuitries 310 may perform PCS and FEC operations on the data flows a through f, for example according with Clause 119 of IEEE 802.3-2018. Thus, the PCS and FEC operations may include, in the case of data flows a through f being routed toward switch device 304, alignment locking, lane deskewing, lane reordering and de-interleaving, FEC decoding, post FEC interleaving, alignment marker removal, descrambling and/or reverse transcoding.

An output of PCS/FEC circuitries 310 may include, for example, only 66 bit (66b) PCS symbols without alignment markers (removed by way of PCS/FEC circuitries 310). The PCS symbols from PCS/FEC circuitries 310 may then undergo rate adaptation at 311 within the respective retimer devices.

Rate adaptation may include inserting/removing idle symbols in the gaps between data packets.

In the state of the art, as demonstrated for example by way of a data flow from 200G PCS/FEC circuitry 310*c/d* and 400G PCS/FEC circuitry 310*e/f*, after rate adaptation 311, the PCS symbols are routed to a second stage 314 of PCS/FEC circuitries including 200G PCS/FEC circuitry 314*c/d* and 400G PCS/FEC circuitry 314*e/f*, which implement additional PCS/FEC processes on the corresponding signals routed to them, such as, for example, transcoding, scrambling, alignment marker insertion, FEC encoding and/or interleaving.

According to some embodiments, a retimer port expander 312 between PCS/FEC circuitries 310*a* and 310*b* is to multiplex the two 100G PCS symbols corresponding to data flows a and b in order to form a 200G multiplexed data stream 345 therefrom according to a predetermined multiplexing algorithm. The multiplexing algorithm may be configurable to the multiplexing device, for example by CPU 350.

For example, the retimer port expander 312 may be configured by the CPU 350 to implement a plurality of multiplexing algorithms to incoming data flows a and b. For example, the retimer port expander 312 may be adapted to implement a single multiplexing algorithm at any given time and may need to be reconfigured every time the multiplexing algorithm is to be changed to a different multiplexing algorithm. Alternatively, the retimer port expander 312 may be to implement multiple multiplexing algorithms by selecting between them from a memory without a need to be reconfigured by the CPI 350 to change from one multiplexing algorithm to a different multiplexing algorithm.

The retimer port expander 312 may determine to multiplex the PCS symbols of data flows a and b according to any multiplexing algorithm. For example, the multiplexing algorithm may include alternating PCS symbols based on their respective symbol numbers as between data flows a and b. For example, the multiplexing algorithm may involve alternating odd and even, or even and odd PCS symbols of the respective data flows a and b (e.g., PCSa0 PCSb0 PCSa1 PCSb1 . . . ; or PCSb0 PCSa0 PCSb1 PCSa1 . . . ). Hence, multiplexed data stream 345 may include a sequence of PCS symbols including PCS symbols of data stream a (PCS a) alternating with PCS symbols of data stream b (PCS b) based on the symbol numbers of each symbol (e.g., PCSa0 PCSa1 PCSb0 PCSb1 . . . ; or PCSb0 PCSb1 PCSa0 PCSa1 . . . ).

Other multiplexing algorithms are possible for the retimer port expander 312, such as any first number of PCS a followed by any second number of PCS b.

The multiplexed data stream 345, which, as previously noted, may include only multiplexed PCS symbols of speed 100G, along with data flows in the form of PCS symbols corresponding to data flows c or d (c/d), and e or f (elf) (c/d and e/f routed and processed in the retimer devices according to the state of the art), are routed to PCS/FEC circuitries 314*ab*, 314*c/d* and 314*e/f*, respectively. The latter PCS/FEC circuitries may perform PCS and FEC operations on the data flows ab (corresponding to multiplexed data stream 345), c/d and e/f, for example according with Clause 119 of IEEE 802.3-2018. Thus, the PCS and FEC operations may include, in the case of data flows a through f being routed toward switch device 304, transcoding the PCS symbols, scrambling, alignment marker insertion, FEC encoding and interleaving.

Unscrambled 66*b* PCS symbols are passed from the 100G PCS/FECs 310*a*, 310*b*, 310*c/d* and from the 400G PCS/FEC 310*e/f* without alignment markers toward the switch side respective 200G PCS/FEC circuitries 314*ab*, 314*c/d* and 400G PCS/FEC circuitry 314*e/f*. The 200G PCS/FEC layers 314*ab* and 314*c/d*, and the 400G PCS/FEC layer 314*e/f* may insert periodic alignment markers into the PCS symbol flow. For example, a switch side PCS/FEC layer may insert 16 alignment markers for every 320K—16 normal (e.g., data carrying) 66*b* PCS symbols. The occurrence of these alignment markers is exposed at the MACs within the switch device 304, and the 66b PCS symbols can thereby be numbered the same at both the transmitter and the receiver, e.g., 0, 1, 2, 3, 0, 1, 2, 3 etc.

The multiplexed data flow 345 corresponding to data flows a and b (ab), along with data flow c/d, are then routed to respective SerDes circuitries 316*ab* and 316*c/d*, which may deserialize the data flows ab and c/d, and route them, respectively, onto links A and B toward switch 304.

According to an embodiment, the data flows for ports a and b are multiplexed by retimer port expander 312, and are transmitted from retimer device 302-1 to switch device 304 as a multiplexed data stream on link A, the multiplexed data stream to be later demultiplexed in the switch device based on the same multiplexing algorithm used to generate the multiplexed data stream 345.

According to some embodiments, a multiplexed data stream is to use all of the bandwidth of the retimer to switch link onto which it is allocated. Thus, according to some embodiments, one may not allocate only two 100G data flows onto a 400G common link, but any combination of data flows the sum of speeds of which totals the speed of the common link may be multiplexed according to some embodiments.

In the switch to port expander direction the above goal may be trivially fulfilled if a common clock in the switch paces the generation of egress data from the involved MACs. In the direction towards the switch however, rate adaption 311 may need to be performed, for example in the multiplexing device 312, by inserting/deleting idle symbols in the interframe gaps of the data flows being processed. A same function however is also used in traditional retimer/gearbox devices when the recovered receive (Rx) clock from one side does not drive the transmit (Tx) clock on the other side.

According to an example, 100G and/or 50G streams carried across a 200G link are not to include native (i.e. 100G and/or 50G) alignment markers. A placement of alignment markers is a function of data flow speed. Thus, alignment markers for the data flows to be multiplexed, for example data flows a and b in FIG. 3, are removed at the PCS/FEC layers 310*a* and 310*b*, and thus are not transferred into the multiplexed data stream as they are not needed. The sequences of PCS symbols corresponding to data flows a and b over the 200G link A may be inherently ordered. The native metaframes on the line side of retimer 302-1 may be terminated in the port expander or retimer port expander 312.

Data flows c/d and e/f are routed within the retimer devices 302-1 and 302-2 according to the state of the art. For example data flows c or d are routed to switch device 304 on link B, for example in a time sliced manner. Data flows e or f are routed through PCS/FEC circuitry 314*e/f*, for example in a time-sliced manner. They may be routed after PCS/FEC processing to switch device 304 on links C or D, respectively. For the prior art data flows e, and f, no multiplexed data stream emerges toward the switch device from the corresponding retimer device 302-2. For the prior art data flows c and d, the transmission on link B does not correspond to a multiplexing of data flows c and d based on a multiplexing algorithm, and further on one that is reversable on the switch side to generate respective demultiplexed data flows.

Referring now to operation at the switch device 304, according to an embodiment, the multiplexed data stream 345 is routed via link A to SerDes 318*ab*, which serializes the multiplexed data stream 345, routes it to PCS/FEC circuitry 322*ab*, which then routes multiplexed data stream 345 to a demultiplexer circuitry 332. The demultiplexer circuitry 332 is to demultiplex the multiplexed data stream 345 into its constituent 100G data flow a and 100G data flow b, and route the data flows a and b to a respective 100G MAC circuitries 324*a* and 324*b*.

The switch port expander 332 between 200G PCS/FEC circuitry 322*ab* and MAC circuitries 324*a* and 324*b* is to demultiplex the two 100G PCS symbols corresponding to data flows a and b and emerging from the 200G PCS/FEC circuitry 322*ab* in order to form two 100G demultiplexed data flows a and b therefrom according to a predetermined demultiplexing algorithm which is based on reversing the multiplexing algorithm of the retimer port expander 312 of retimer device 310-1. Thus, in the same manner in for the retimer port expander 312, the demultiplexing algorithm may be configurable to the switch port expander, for example by CPU 350.

Similar to the retimer port expander 312, for example, the switch port expander 332 may be configured by the CPU 350 to be adapted to implement a plurality of demultiplexing algorithms to incoming multiplexed data stream 345. For example, the switch port expander 332 may be adapted to implement a single demultiplexing algorithm at any given time and may need to be reconfigured every time the demultiplexing algorithm is to be changed to a new, different demultiplexing algorithm. Alternatively, the switch port expander 332 may be to implement multiple demultiplexing algorithms by selecting between them from a memory without a need to be reconfigured by the CPI 350 to change from one demultiplexing algorithm to a different demultiplexing algorithm.

If the configuration of the retimer port expander 312 was, for example, to multiplex the PCS symbols of data flows a and b by alternating PCS symbols as between data flows a and b in data stream 345, the switch port expander 332 would be configured to recognize the same, and to therefore perform demultiplexing of the data stream 345 to reverse the multiplexing of the same based on the noted multiplexing algorithm.

With respect to multiplexing or demultiplexing, embodiments include within their scope multiplexing (and hence demultiplexing) more than two data flows, and/or data flows that may have different speeds with respect to one another, for example two 50G data flows multiplexed with one 100G data flow for further processing through 200G PCS/FEC layers and 200G SerDes, but for demultiplexing to two 50G data flows and one 100G data flow for undergoing MAC operations in respective MAC layers including two 50G MAC layers and one 100G MAC layer. In such a case, with three data flows x, y and z, with x corresponding to a 100G data flow and y and z corresponding to the two 50G data flows, the multiplexing algorithm could multiplex the data flow according to an allocation xyxzxyxzxyxz . . . .

Data flows c/d and e/f are routed to switch 304 via links B (for data flow c/d), link C (for data flow e) and link D (for data flow f). and are routed within switch device 304 according to the state of the art. The data flows entering switch device 304 through links B, C and D are routed to respective 200G SerDes circuitries 320*c/d*, 320*e* and 320*f*.

SerDes circuitries 320*c/d*, 320*e* and 320*f* serialize the respective data flows c/d and e/f, route them to respective PCS/FEC circuitries 322*c/d* and 322*e/f*, which then route the data flows c/d, and e/f to respective 200G MAC circuitries 324*c/d* and 324*e/f*.

For the prior art data flows e and f, as mentioned previously, no multiplexed data stream emerges from the retimer 302-2 toward the switch device 304. For the prior art data flows c and d, there is no demultiplexing at the switch device for transmission through respective MACs.

Both the switch and the retimer multiplexing circuitry (or "port expander"), according to some embodiments, may reside in a same enclosure (e.g., switch box) controlled by a same CPU (e.g., 350). Allocation of bandwidths among various components of the retimer may therefore be implemented within the enclosure out of band and need not be negotiated by the CPU. According to an embodiment, a 200G link between a port expander and the switch may be trained in a similar manner as with a 200G port. For ports on the line side of the retimer device, the port expander may perform auto negotiation and link training with corresponding peers.

For multiple data flows to be independently transferred in multiplexed form over a same link between a retimer and a switch, some embodiments include the multiplexed data stream to include only 66b PCS symbols with legal synchronization headers and legal block type bytes. According to some embodiments, flawed symbols may be replaced at the retimer by well-formed error symbols before transmission on the common link. This ensures that traffic on one data flow of the multiplexed data stream cannot disturb other constituent data flows of the multiplexed data stream.

Although the description above regarding FIG. 3 is in the context of data flows in a direction from the re-timer devices toward the switch device, as noted previously, embodiments include within their scope data flows in an opposite direction, going from the switch toward the retimer devices for transmission by the retimer devices from ports 306. Thus, focusing on the circuitry of the switch device 304 and of the retimer device 302-1 according to some embodiments, 100G data flows a and b may enter switch device 304 through ports 303, be switched by the switching circuitry 326, enter the MAC circuitries 324*a* and 324*b* respectively, and thereafter be multiplexed by switch port expander 332 into a multiplexed data stream 346, which is routed through 200G PCS/FEC layer 322*ab*. PCS/FEC layer 322*ab* may generate only PCS symbols from the multiplexed data stream 346 and insert alignment markers therein. The PCS multiplexed symbols in multiplexed data stream 346 may then enter 200G SerDes 320*ab*, and 200G link A for transmission to the 200G SerDes 316*ab* of retimer device 302-1, where they may be serialized before entering PCS/FEC circuitry 314*ab*, where alignment markers may be removed. Thereafter, the PCS symbols may be demultiplexed by retimer port expander 312 into data flows a and b, routed to the respective PCS/FEC layers 310 and 310*b*, where alignment markers may again be inserted. Thereafter, the respective data flows may be routed to respective SerDes' 308*a* and 308*b* for transmission by way of respective ports 306*a* and 306*b*. State of the art data flows c, d, e and f may also flow from the switch device toward the retimer device according to the state of the art.

Some embodiments provide a switch system of a computing network, such as switch package 355, the switch system including a retimer device (e.g., retimer device 302-1) and a switch device (e.g., switch device 304) coupled to the retimer device. The retimer device may have a first physical retimer input/output (I/O) (e.g., corresponding to physical I/Os at line side 301 of retimer device 302-1), and a second physical retimer (I/O) (e.g., corresponding to a physical I/O at a switch side of the retimer device 302-1), and retimer circuitry (e.g., SerDes circuitries 308 and 316, PCS/FEC circuitries 310 and 314, rate adaptation circuitry, port extender 312) coupled between the first retimer I/O and the second retimer I/O. The retimer circuitry is to: implement a plurality of retimer ports (e.g., ports 306*a* and 306*b*) at the first retimer I/O, and a data link (e.g., data link A) at the second retimer I/O; access a plurality of retimer data flows (e.g., data flows a and b) from the plurality of retimer ports at the first retimer I/O; determine a multiplexed data stream (e.g., multiplexed data stream 345) from the plurality of retimer data flows by implementing a multiplexing algorithm (e.g., at port extender 312); and send the multiplexed data stream for transmission from the data link (e.g., data link A) at the second retimer I/O. The switch device (e.g., 304) is coupled to the retimer device by way of the data link (e.g., data link A), the switch device having a first physical switch input/output (I/O) (e.g., at a host side 303 thereof) and a second physical switch (I/O) (e.g., at a retimer side thereof), and switch circuitry (e.g., SerDes circuitries 320, PCS/FEC circuitries 322, port extender 332, MAC circuitries 324, switching circuitry 326) coupled between the first switch I/O and the second switch I/O, the switch circuitry to: implement the data link (e.g., data link A) at the second switch I/O and a plurality of switch ports (e.g., 303*a* and 303*b*) at the first switch I/O; access the multiplexed data stream (e.g., 345) at the data link; determine a plurality of switch data flows from the multiplexed data stream by implementing a demultiplexing algorithm (e.g., at port extender 332) the demultiplexing algorithm based on the multiplexing algorithm, the plurality of switch data flows corresponding to a demultiplexing of the plurality of retimer data flows from the multiplexed data steam; and send respective ones of the plurality of switch data flows (e.g., data flows a and b) for transmission from respective ones of the plurality of switch ports (e.g., ports 303*a* and 303*b*) at the first switch I/O.

While the embodiment to FIG. 3 shows computing resources in the retimer device 302-1, such as 200G SerDes 316*ab*, the maximum bandwidth of which matches the combined bandwidths (100G+100G) of the data flows being multiplexed in multiplexer 312, embodiments are not so limited, and include within their scope an oversubscribing of resources within a retimer device, such as the provision of a 300G SerDes 316*ab* although, in operation, only two 100G data flows may be multiplexed into it by multiplexer 312.

Similarly, while the embodiment to FIG. 3 shows computing resources in the switch device 302-1, such as a 200G SerDes 320*ab* and two 100G MACs 324*a* and 324*b*, the combined bandwidths of which match the maximum bandwidth of SerDes 320*ab* (200G), embodiments are not so limited, and include within their scope an oversubscribing of resources within a switch device, such as the provision of a 300G SerDes 320*ab* and a matching three MACs at 100G each, although, in operation, only two 100G data flows may be inputted into the SerDes and demultiplexed to only two of the MACs.

Figure 4:
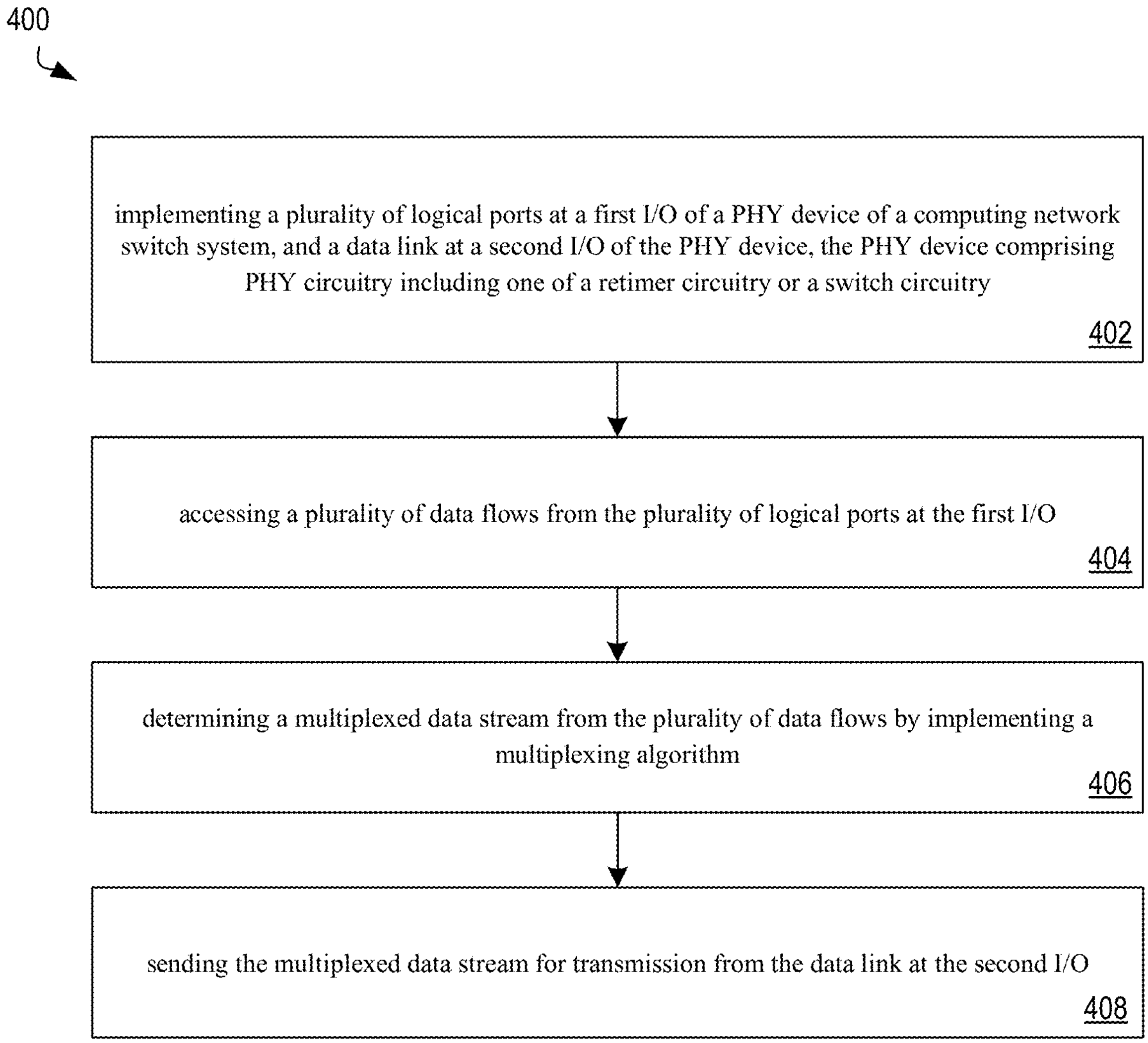
FIG. 4 depicts a process according to some embodiments.

FIG. 4 depicts a process 400 to be performed at a physical layer (PHY) circuitry of a PHY device of a computing network switch system, the PHY circuitry including one of a retimer circuitry or a switch circuitry, according to some embodiments. The process 400 at operation 402 includes implementing a plurality of ports at a first I/O of the PHY device, and a data link at a second I/O of the PHY device. The process 400 at operation 404 includes accessing a plurality of data flows from the plurality of ports at the first I/O. The process 400 at operation 406 includes, determining a multiplexed data stream from the plurality of data flows by implementing a multiplexing algorithm. The process 400 at operation 408 includes sending the multiplexed data stream for transmission from the data link at the second I/O.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores," may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for another. For example, descriptions using the terms "connected" and/or "coupled" may indicate that two or more elements are in direct physical or electrical contact with another. The term "coupled," however, may also mean that two or more elements are not in direct contact with another, but yet still co-operate or interact with another.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be present. Additionally, conjunctive language such as the phrase "at least one of X, Y, and Z," unless specifically stated otherwise, should also be understood to mean X, Y, Z, or any combination thereof, including "X, Y, and/or Z."'

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. A component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes A physical layer (PHY) device including a first physical input/output (I/O), and a second physical (I/O), and PHY circuitry coupled between the first I/O and the second I/O, the PHY circuitry corresponding to one of a retimer circuitry or a switch circuitry of a computing network, the PHY circuitry to: implement a plurality of ports at the first I/O, and a data link at the second I/O; access a plurality of data flows from the plurality of ports at the first I/O; determine a multiplexed data stream from the plurality of data flows by implementing a multiplexing algorithm; and send the multiplexed data stream for transmission from the data link at the second IO.

Example 2 includes the subject matter of Example 1, wherein the PHY circuitry is configurable, by a processing circuitry coupled to the PHY device, to the multiplexing algorithm.

Example 3 includes the subject matter of Example 2, the PHY circuitry is configurable by the processing circuitry to implement a plurality of multiplexing algorithms, the PHY circuitry to select the multiplexing algorithm from the plurality of multiplexing algorithms prior to determining the multiplexed data stream.

Example 4 includes the subject matter of Example 1, wherein implementing the multiplexing algorithm includes alternating symbols of the plurality of data flows on the multiplexed data stream.

Example 5 includes the subject matter of Example 4, wherein alternating includes alternating odd and even ones of the symbols.

Example 6 includes the subject matter of Example 1, wherein a link speed associated with the data link at the second I/O is substantially equal to a sum of speeds associated with respective ones of the plurality of data flows.

Example 7 includes the subject matter of any one of Examples 1-6, wherein the PHY device corresponds to a retimer device, and the PHY circuitry corresponds to the retimer circuitry, the PHY device further including a plurality of serializer/deserializer (SerDes) circuitries, respective ones of the SerDes circuitries to access respective ones of the plurality of data flows from the plurality of ports, and to output, based on the respective ones of the plurality of data flows, respective SerDes output data flows.

Example 8 includes the subject matter of Example 7, the respective ones of the SerDes circuitries having respective speeds substantially equal to respective speeds of the respective ones of the plurality of data flows.

Example 9 includes the subject matter of Example 7, further including a plurality of physical coding sublayer (PCS) and forward error correction (FEC) (PCS/FEC) circuitries, respective ones of the PCS/FEC circuitries to access respective ones of the SerDes output data flows, and to output, based on the respective ones of the SerDes output data flows, respective PCS/FEC output data flows.

Example 10 includes the subject matter of Example 9, the respective ones of the PCS/FEC circuitries having respective speeds substantially equal to respective speeds of the respective ones of the SerDes circuitries and to respective speeds of the respective ones of the plurality of data flows.

Example 11 includes the subject matter of Example 9, further including a port extender device, the port extender device to determine the multiplexed data stream by implementing the multiplexing algorithm, the port extender device to access the PCS/FEC output data flows, and to multiplex the PCS/FEC output data flows to generate a port extender multiplexed data flow therefrom at an output thereof, the port extender multiplexed data flow corresponding to the multiplexed data stream.

Example 12 includes the subject matter of Example 9, wherein the PCS/FEC circuitries are to remove alignment markers from the respective ones of the SerDes output data flows.

Example 13 includes the subject matter of any one of Examples 9-12, wherein the PCS/FEC output data flows include only PCS symbols.

Example 14 includes the subject matter of Example 11, wherein the PC S/FEC circuitries are line side PCS/FEC circuitries and the PCS/FEC output data flows are line side PCS/FEC output data flows, the PHY device further including a switch side PCS/FEC circuitry to access the port extender multiplexed data flow from the output of the port extender device, and to generate a switch side PCS/FEC output data flow therefrom, the switch side PCS/FEC output data flow corresponding to the multiplexed data stream.

Example 15 includes the subject matter of Example 14, wherein the SerDes circuitries are line side SerDes circuitries and the SerDes output data flows are line side SerDes output data flows, the PHY device further including a switch side SerDes circuitry to access the switch side PCS/FEC output data flow, and to generate a switch side SerDes output data flow therefrom, the switch side SerDes output data flow corresponding to the multiplexed data stream, the switch side SerDes circuitry further coupled to the data link to send the switch side SerDes output data flow for transmission on the data link.

Example 16 includes the subject matter of any one of Examples 1-6, wherein the PHY device corresponds to a switch device, and the PHY circuitry corresponds to the switch circuitry, the PHY device further including a plurality of MAC circuitries, respective ones of the MAC circuitries to access respective ones of the plurality of data flows from the plurality of ports, and to output, based on the respective ones of the plurality of data flows, respective MAC output data flows.

Example 17 includes the subject matter of Example 16, the respective ones of the MAC circuitries having respective speeds substantially equal to respective speeds of the respective ones of the plurality of data flows.

Example 18 includes the subject matter of Example 17, further including a port extender device, the port extender device to determine the multiplexed data stream by implementing the multiplexing algorithm, the port extender device to access the MAC output data flows, and to multiplex the MAC data flows to generate a port extender multiplexed data flow therefrom at an output thereof, the port extender multiplexed data flow corresponding to the multiplexed data stream.

Example 19 includes the subject matter of Example 18, further including a physical coding sublayer (PCS) and forward error correction (FEC) (PCS/FEC) circuitry, the PCS/FEC circuitry to access the port extender multiplexed data flow, and to output, based thereon, a PCS/FEC output data flow, the PCS/FEC output data flow corresponding to the multiplexed data stream.

Example 20 includes the subject matter of Example 9, wherein the PCS/FEC circuitry is to add alignment markers to the port extender multiplexed data flow to generate the PCS/FEC output data flow.

Example 21 includes the subject matter of any one of Examples 19-20, wherein the PCS/FEC output data flow includes only PCS symbols.

Example 22 includes the subject matter of any one of Examples 19-20, the PCS/FEC circuitry having a speed that is substantially equal to a sum of speeds of the plurality of MAC circuitries, and to a sum of speeds of the plurality of data flows.

Example 23 includes the subject matter of any one of Examples 19-20, further including a serializer/deserializer circuitry to access the PCS/FEC output data flow, and to generate a SerDes output data flow therefrom, the SerDes output data flow corresponding to the multiplexed data stream, the SerDes circuitry further coupled to the data link to send the SerDes output data flow for transmission on the data link.

Example 24 includes the subject matter of any one of Examples 1-23, wherein the multiplexed data stream is a first multiplexed data stream, the plurality of data flows are a first plurality of data flows, the PHY circuitry to further: access a second multiplexed data stream from the data link; determine a second plurality of data flows from the second multiplexed data stream by implementing a demultiplexing algorithm, the second data flows corresponding to a demultiplexing of the second multiplexed data steam; and send respective ones of the second plurality of data flows for transmission from respective ones of the plurality of ports at the first I/O.

Example 25 includes a switch system of a computing network, the switch system including: a retimer device having a first physical retimer input/output (I/O), and a second physical retimer (I/O), and retimer circuitry coupled between the first retimer I/O and the second retimer I/O, the retimer circuitry to: implement a plurality of retimer ports at the first retimer I/O, and a data link at the second retimer I/O; access a plurality of retimer data flows from the plurality of retimer ports at the first retimer I/O; determine a multiplexed data stream from the plurality of retimer data flows by implementing a multiplexing algorithm; and send the multiplexed data stream for transmission from the data link at the second retimer I/O; and a switch device coupled to the retimer device by way of the data link, the switch device having a first physical switch input/output (I/O), and a second physical switch (I/O), and switch circuitry coupled between the first switch I/O and the second switch I/O, the switch circuitry to: implement the data link at the second switch I/O and a plurality of switch ports at the first switch I/O; access the multiplexed data stream at the data link; determine a plurality of switch data flows from the second multiplexed data stream by implementing a demultiplexing algorithm, the demultiplexing algorithm based on the multiplexing algorithm, the plurality of switch data flows corresponding to a demultiplexing of the plurality of retimer data flows from the multiplexed data steam; and send respective ones of the plurality of second data flows for transmission from respective ones of the plurality of switch ports at the first switch I/O.

Example 26 includes the subject matter of Example 25, wherein the retimer circuitry is configurable, by a processing circuitry coupled to the retimer circuitry, to the multiplexing algorithm, and wherein the switch circuitry is configurable, by the processing circuitry, to the demultiplexing algorithm.

Example 27 includes the subject matter of Example 26, wherein the retimer circuitry is configurable by the processing circuitry to implement a plurality of multiplexing algorithms, and the switch circuitry is configurable by the processing circuitry to implement a plurality of corresponding demultiplexing algorithms, the retimer circuitry to select the multiplexing algorithm from the plurality of multiplexing algorithms prior to determining the multiplexed data stream, the switch circuitry to select the demultiplexing algorithm from the plurality of demultiplexing algorithms to determine the plurality of switch data flows.

Example 28 includes the subject matter of Example 25, wherein implementing the multiplexing algorithm includes alternating symbols of the plurality of data flows on the multiplexed data stream.

Example 29 includes the subject matter of Example 28, wherein alternating includes alternating odd and even ones of the symbols.

Example 30 includes the subject matter of Example 25, wherein a link speed associated with the data link at the second I/O is substantially equal to a sum of speeds associated with respective ones of the plurality of retimer data flows and with respective ones of the plurality of switch data flows.

Example 31 includes the subject matter of any one of Examples 25-30, the retimer device further including a plurality of retimer serializer/deserializer (SerDes) circuitries, respective ones of the retimer SerDes circuitries to access respective ones of the plurality of retimer data flows from the plurality of retimer ports, and to output, based on the respective ones of the plurality of retimer data flows, respective retimer SerDes output data flows.

Example 32 includes the subject matter of Example 31, the respective ones of the retimer SerDes circuitries having respective speeds substantially equal to respective speeds of the respective ones of the plurality of retimer data flows.

Example 33 includes the subject matter of Example 31, further including a plurality of retimer physical coding sublayer (PCS) and forward error correction (FEC) (PCS/FEC) circuitries, respective ones of the retimer PC S/FEC circuitries to access respective ones of the retimer SerDes output data flows, and to output, based on the respective ones of the retimer SerDes output data flows, respective retimer PCS/FEC output data flows.

Example 34 includes the subject matter of Example 33, the respective ones of the retimer PCS/FEC circuitries having respective speeds substantially equal to respective speeds of the respective ones of the retimer SerDes circuitries and to respective speeds of the respective ones of the plurality of retimer data flows.

Example 35 includes the subject matter of Example 33, further including a retimer port extender device, the retimer port extender device to determine the multiplexed data stream by implementing the multiplexing algorithm, the retimer port extender device to access the retimer PC S/FEC output data flows, and to multiplex the retimer PCS/FEC output data flows to generate a retimer port extender multiplexed data flow therefrom at an output thereof, the retimer port extender multiplexed data flow corresponding to the multiplexed data stream.

Example 36 includes the subject matter of Example 33, wherein the retimer PCS/FEC circuitries are to remove alignment markers from the respective ones of the retimer SerDes output data flows.

Example 37 includes the subject matter of any one of Examples 9-12, wherein the retimer PCS/FEC output data flows include only PCS symbols.

Example 38 includes the subject matter of Example 35, wherein the retimer PCS/FEC circuitries are line side retimer PCS/FEC circuitries and the retimer PCS/FEC output data flows are line side retimer PC S/FEC output data flows, the retimer device further including a switch side retimer PCS/FEC circuitry to access the retimer port extender multiplexed data flow from the output of the retimer port extender device, and to generate a switch side retimer PCS/FEC output data flow therefrom, the switch side retimer PC S/FEC output data flow corresponding to the multiplexed data stream.

Example 39 includes the subject matter of Example 38, wherein the retimer SerDes circuitries are line side retimer SerDes circuitries and the retimer SerDes output data flows are line side retimer SerDes output data flows, the retimer device further including a switch side retimer SerDes circuitry to access the switch side retimer PCS/FEC output data flow, and to generate a switch side retimer SerDes output data flow therefrom, the switch side retimer SerDes output data flow corresponding to the multiplexed data stream, the switch side retimer SerDes circuitry further coupled to the data link to send the switch side retimer SerDes output data flow for transmission on the data link to the switch device.

Example 40 includes the subject matter of any one of Examples 25-39, further including a switch serializer/deserializer (SerDes) circuitry to access the multiplexed data flow on the data link, and to generate a switch SerDes output data flow therefrom, the switch SerDes output data flow corresponding to the multiplexed data stream.

Example 41 includes the subject matter of Example 18, further including a switch PCS/FEC circuitry, the switch PCS/FEC circuitry to access the switch SerDes output data flow, and to generate a switch PCS/FEC output data flow at an output thereof, the switch PCS/FEC output data flow corresponding to the multiplexed data stream.

Example 42 includes the subject matter of Example 41, further including a switch port extender device, the switch port extender device to access the switch PCS/FEC output data flow and to implement the demultiplexing algorithm thereon to generate a plurality of switch port extender data flows at an output thereof.

Example 43 includes the subject matter of Example 42, wherein the switch PCS/FEC circuitry is to remove alignment markers from the switch SerDes data flows to generate the switch PCS/FEC output data flow.

Example 44 includes the subject matter of any one of Examples 41-43, wherein the PCS/FEC output data flow includes only PCS symbols.

Example 45 includes the subject matter of any one of Examples 40-44, the switch device further including a plurality of MAC circuitries, respective ones of the MAC circuitries to access respective ones of the plurality of switch port extender data flows, and to output, based on the respective ones of the plurality of switch port extender data flows, respective MAC output data flows.

Example 46 includes the subject matter of Example 45, the respective ones of the MAC circuitries having respective speeds substantially equal to respective speeds of the respective ones of the plurality of retimer data flows.

Example 47 includes the subject matter of Example 46, the switch PCS/FEC circuitry having a speed that is substantially equal to a sum of speeds of the plurality of MAC circuitries, and to a sum of speeds of the plurality of retimer data flows.

Example 48 includes the subject matter of any one of Examples 25-56, further including a switch box housing, the retimer device and the switch device within the housing.

Example 49 includes one or more tangible non-transitory machine readable storage media storing instructions that, when executed at one of a retimer circuitry or a switch circuitry of a computing network switch system, causes the PHY circuitry to perform operations including: implementing a plurality of ports at a first I/O of the PHY device, and a data link at a second I/O of the PHY device; accessing a plurality of data flows from the plurality of ports at the first I/O; determining a multiplexed data stream from the plurality of data flows by implementing a multiplexing algorithm; and sending the multiplexed data stream for transmission from the data link at the second I/O.

Example 50 includes the subject matter of Example 49, the operations further including configuring the PHY device to the multiplexing algorithm.

Example 51 includes the subject matter of Example 50, configuring the PHY circuitry to a plurality of multiplexing algorithms, and selecting the multiplexing algorithm from the plurality of multiplexing algorithms prior to determining the multiplexed data stream.

Example 52 includes the subject matter of Example 49, wherein implementing the multiplexing algorithm includes alternating symbols of the plurality of data flows on the multiplexed data stream.

Example 53 includes the subject matter of Example 52, wherein alternating includes alternating odd and even ones of the symbols.

Example 54 includes the subject matter of Example 49, wherein a link speed associated with the data link at the second I/O is substantially equal to a sum of speeds associated with respective ones of the plurality of data flows.

Example 55 includes the subject matter of any one of Examples 49-54, wherein the PHY device corresponds to a retimer device, and the PHY circuitry corresponds to the retimer circuitry, the operations further including accessing, at a serializer and deserializer (SerDes) circuitry of the PHY device, respective ones of the plurality of data flows from the plurality of ports, and outputting from the SerDes circuitry, based on the respective ones of the plurality of data flows, respective SerDes output data flows.

Example 56 includes the subject matter of Example 55, the respective ones of the SerDes output data flows have respective speeds substantially equal to respective speeds of the respective ones of the plurality of data flows.

Example 57 includes the subject matter of Example 55, the operations further including accessing, at respective ones of a plurality of physical coding sublayer (PCS) and forward error correction (FEC) (PCS/FEC) circuitries of the PHY device, respective ones of the SerDes output data flows, implementing a PCS/FEC operation on the SerDes output data flows, and outputting, from the respective ones of the plurality of PCS/FEC circuitries, based on the respective ones of the SerDes output data flows, respective PCS/FEC output data flows.

Example 58 includes the subject matter of Example 57, the respective ones of the PCS/FEC output data flows having respective speeds substantially equal to respective speeds of the respective ones of the SerDes output data flows and to respective speeds of the respective ones of the plurality of data flows.

Example 59 includes the subject matter of Example 57, the operations further including, at a port extender device, determining the multiplexed data stream by accessing the PCS/FEC output data flows, and multiplexing the PCS/FEC output data flows to generate a port extender multiplexed data flow therefrom, the port extender multiplexed data flow corresponding to the multiplexed data stream.

Example 60 includes the subject matter of Example 57, implementing the PCS/FEC operations include removing alignment markers from the respective ones of the SerDes output data flows.

Example 61 includes the subject matter of any one of Examples 57-60, wherein the PCS/FEC output data flows include only PCS symbols.

Example 62 includes the subject matter of Example 59, wherein the PC S/FEC output data flows are line side PCS/FEC output data flows, the operations further including, at a switch side PCS/FEC circuitry of the PHY device, accessing the port extender multiplexed data flow from the output of the port extender device, and generating a switch side PCS/FEC output data flow therefrom, the switch side PCS/FEC output data flow corresponding to the multiplexed data stream.

Example 63 includes the subject matter of Example 62, wherein the SerDes output data flows are line side SerDes output data flows, the operations further including, at a switch side SerDes circuitry of the PHY device, accessing the switch side PCS/FEC output data flow, and generating a switch side SerDes output data flow therefrom, the switch side SerDes output data flow corresponding to the multiplexed data stream.

Example 64 includes the subject matter of any one of Examples 49-54, wherein the PHY device corresponds to a switch device, and the PHY circuitry corresponds to the switch circuitry, the operations further including accessing, at respective ones of MAC circuitries of the PHY device, respective ones of the plurality of data flows from the plurality of ports, and outputting, based on the respective ones of the plurality of data flows, respective MAC output data flows.

Example 65 includes the subject matter of Example 64, the respective ones of the MAC output data flows having respective speeds substantially equal to respective speeds of the respective ones of the plurality of data flows.

Example 66 includes the subject matter of Example 65, the operations further including, at a port extender device, determining the multiplexed data stream by accessing the MAC output data flows, and multiplexing the MAC data flows to generate a port extender multiplexed data flow therefrom, the port extender multiplexed data flow corresponding to the multiplexed data stream.

Example 67 includes the subject matter of Example 66, the operations further including, at a physical coding sublayer (PCS) and forward error correction (FEC) (PCS/FEC) circuitry, accessing the port extender multiplexed data flow, and generating, based thereon, a PCS/FEC output data flow, the PCS/FEC output data flow corresponding to the multiplexed data stream.

Example 68 includes the subject matter of Example 57, the operations further including, at the PCS/FEC circuitry, adding alignment markers to the port extender multiplexed data flow to generate the PC S/FEC output data flow.

Example 69 includes the subject matter of any one of Examples 67-68, wherein the PCS/FEC output data flow includes only PCS symbols.

Example 70 includes the subject matter of any one of Examples 67-68, the PCS/FEC output data flow having a speed that is substantially equal to a sum of speeds of the plurality of MAC output data flows, and to a sum of speeds of the plurality of data flows.

Example 71 includes the subject matter of any one of Examples 67-68, the operations further including, at a serializer/deserializer (SerDes) circuitry, accessing the PCS/FEC output data flow, and generating a SerDes output data flow therefrom, the SerDes output data flow corresponding to the multiplexed data stream.

Example 72 includes the subject matter of any one of Examples 49-71, wherein the multiplexed data stream is a first multiplexed data stream, the plurality of data flows are a first plurality of data flows, the operations further including: accessing a second multiplexed data stream from the data link; determining a second plurality of data flows from the second multiplexed data stream by implementing a demultiplexing algorithm, the second data flows corresponding to a demultiplexing of the second multiplexed data steam; and sending respective ones of the second plurality of data flows for transmission from respective ones of the plurality of ports at the first I/O.

Example 73 includes a method to be performed at a physical layer (PHY) circuitry of a PHY device of a switch system of a computing network, the method including: implementing a plurality of ports at a first I/O of the PHY device, and a data link at a second I/O of the PHY device; accessing a plurality of data flows from the plurality of ports at the first I/O; determining a multiplexed data stream from the plurality of data flows by implementing a multiplexing algorithm; and sending the multiplexed data stream for transmission from the data link at the second I/O.

Example 74 includes the subject matter of Example 73, further including configuring the PHY circuitry to the multiplexing algorithm.

Example 75 includes the subject matter of Example 74, further including configuring the PHY circuitry to a plurality of multiplexing algorithms, and selecting the multiplexing algorithm from the plurality of multiplexing algorithms prior to determining the multiplexed data stream.

Example 76 includes the subject matter of Example 73, wherein implementing the multiplexing algorithm includes alternating symbols of the plurality of data flows on the multiplexed data stream.

Example 77 includes the subject matter of Example 76, wherein alternating includes alternating odd and even ones of the symbols.

Example 78 includes the subject matter of Example 73, wherein a link speed associated with the data link at the second I/O is substantially equal to a sum of speeds associated with respective ones of the plurality of data flows.

Example 79 includes the subject matter of any one of Examples 73-78, wherein the PHY device corresponds to a retimer device, and the PHY circuitry corresponds to the retimer circuitry, the method further including accessing, at a serializer and deserializer (SerDes) circuitry of the PHY device, respective ones of the plurality of data flows from the plurality of ports, and outputting from the SerDes circuitry, based on the respective ones of the plurality of data flows, respective SerDes output data flows.

Example 80 includes the subject matter of Example 79, the respective ones of the SerDes output data flows have respective speeds substantially equal to respective speeds of the respective ones of the plurality of data flows.

Example 81 includes the subject matter of Example 79, the method further including accessing, at respective ones of a plurality of physical coding sublayer (PCS) and forward error correction (FEC) (PCS/FEC) circuitries of the PHY device, respective ones of the SerDes output data flows, implementing a PC S/FEC operation on the SerDes output data flows, and outputting, from the respective ones of the plurality of PCS/FEC circuitries, based on the respective ones of the SerDes output data flows, respective PCS/FEC output data flows.

Example 82 includes the subject matter of Example 81, the respective ones of the PCS/FEC output data flows having respective speeds substantially equal to respective speeds of the respective ones of the SerDes output data flows and to respective speeds of the respective ones of the plurality of data flows.

Example 83 includes the subject matter of Example 81, the method further including, at a port extender device, determining the multiplexed data stream by accessing the PCS/FEC output data flows, and multiplexing the PCS/FEC output data flows to generate a port extender multiplexed data flow therefrom, the port extender multiplexed data flow corresponding to the multiplexed data stream.

Example 84 includes the subject matter of Example 81, implementing the PCS/FEC operations include removing alignment markers from the respective ones of the SerDes output data flows.

Example 85 includes the subject matter of any one of Examples 81-84, wherein the PCS/FEC output data flows include only PCS symbols.

Example 86 includes the subject matter of Example 83, wherein the PC S/FEC output data flows are line side PCS/FEC output data flows, the method further including, at a switch side PCS/FEC circuitry of the PHY device, accessing the port extender multiplexed data flow from the output of the port extender device, and generating a switch side PCS/FEC output data flow therefrom, the switch side PC S/FEC output data flow corresponding to the multiplexed data stream.

Example 87 includes the subject matter of Example 86, wherein the SerDes output data flows are line side SerDes output data flows, the method further including, at a switch side SerDes circuitry of the PHY device, accessing the switch side PC S/FEC output data flow, and generating a switch side SerDes output data flow therefrom, the switch side SerDes output data flow corresponding to the multiplexed data stream.

Example 88 includes the subject matter of any one of Examples 73-78, wherein the PHY device corresponds to a switch device, and the PHY circuitry corresponds to the switch circuitry, the method further including accessing, at respective ones of MAC circuitries of the PHY device, respective ones of the plurality of data flows from the plurality of ports, and outputting, based on the respective ones of the plurality of data flows, respective MAC output data flows.

Example 89 includes the subject matter of Example 88, the respective ones of the MAC output data flows having respective speeds substantially equal to respective speeds of the respective ones of the plurality of data flows.

Example 90 includes the subject matter of Example 89, the method further including, at a port extender device, determining the multiplexed data stream by accessing the MAC output data flows, and multiplexing the MAC data flows to generate a port extender multiplexed data flow therefrom, the port extender multiplexed data flow corresponding to the multiplexed data stream.

Example 91 includes the subject matter of Example 90, the method further including, at a physical coding sublayer (PCS) and forward error correction (FEC) (PCS/FEC) circuitry, accessing the port extender multiplexed data flow, and generating, based thereon, a PC S/FEC output data flow, the PCS/FEC output data flow corresponding to the multiplexed data stream.

Example 92 includes the subject matter of Example 81, the method further including, at the PCS/FEC circuitry, adding alignment markers to the port extender multiplexed data flow to generate the PC S/FEC output data flow.

Example 93 includes the subject matter of any one of Examples 91-92, wherein the PCS/FEC output data flow includes only PCS symbols.

Example 94 includes the subject matter of any one of Examples 91-92, the PCS/FEC output data flow having a speed that is substantially equal to a sum of speeds of the plurality of MAC output data flows, and to a sum of speeds of the plurality of data flows.

Example 95 includes the subject matter of any one of Examples 91-92, the method further including, at a serializer/deserializer (SerDes) circuitry, accessing the PCS/FEC output data flow, and generating a SerDes output data flow therefrom, the SerDes output data flow corresponding to the multiplexed data stream.

Example 96 includes the subject matter of any one of Examples 73-95, wherein the multiplexed data stream is a first multiplexed data stream, the plurality of data flows are a first plurality of data flows, the method further including: accessing a second multiplexed data stream from the data link; determining a second plurality of data flows from the second multiplexed data stream by implementing a demultiplexing algorithm, the second data flows corresponding to a demultiplexing of the second multiplexed data steam; and sending respective ones of the second plurality of data flows for transmission from respective ones of the plurality of ports at the first I/O.

Example A1 includes a computer program comprising the instructions of any one of Examples 49-72.

Example A2 includes an Application Programming Interface defining functions, methods, variables, data structures, and/or protocols for the instructions of any one of Examples 49-72.

Example A3 includes an apparatus comprising circuitry loaded with the instructions of any one of Examples 49-72.

Example A4 includes an apparatus comprising circuitry operable to run the instructions of any one of Examples 49-72.

Example A5 includes an integrated circuit comprising one or more of the processor circuitries of any one of Examples 1-48 and the one or more computer readable storage media of any one of Examples 49-72.

Example A6 includes a computing system comprising the one or more computer readable media of any one of Examples 49-72 and the one or more processing circuitries of any one of Examples 1-48.

Example A7 includes an apparatus comprising means for executing the method of any one of Examples 73-96.

Example A8 includes a signal generated as a result of executing the instructions of any one of Examples 49-72.

Example A9 includes a data unit generated as a result of executing the instructions of any one of Examples 49-72.

Example A10 includes the subject matter of Example A9, wherein the data unit is a datagram, network packet, data frame, data segment, a Protocol Data Unit (PDU), a Service Data Unit (SDU), a message, or a database object.

Example A11 includes a signal encoded with the data unit of any one of Examples A9-A10.

Example A12 includes an electromagnetic signal carrying the instructions of any one of Examples 49-72.

Example A13 includes the subject matter of any one of Examples 73-96, further comprising sending and receiving wireless communications using a transceiver coupled to the one or more processors.

Example A14 includes a machine-readable storage medium including machine-readable instructions which, when executed, implement the method of any one of Examples 73-96.

Example A15 includes a distributed edge computing system comprising: a central server; a plurality of computing nodes communicably coupled to the central server, at least one of the computing nodes including one or more processors and instructions that, when executed by the one or more processors, cause the at least one of the computing nodes to perform operations corresponding the method of any one of Examples 73-96.

The invention claimed is:

1. A physical layer (PHY) device including a first physical input/output (I/O), and a second physical (I/O), and PHY circuitry coupled between the first I/O and the second I/O, the PHY circuitry corresponding to one of a retimer circuitry or a switch circuitry of a computing network, the PHY circuitry to:
- implement a plurality of ports at the first I/O, and a data link at the second I/O;
- access a plurality of data flows from the plurality of ports at the first I/O;
- determine a multiplexed data stream from the plurality of data flows by implementing a multiplexing algorithm; and
- send the multiplexed data stream for transmission from the data link at the second I/O.

2. The PHY device of claim 1, wherein the PHY circuitry is configurable, by a processing circuitry coupled to the PHY device, to the multiplexing algorithm.

3. The PHY device of claim 2, wherein the PHY circuitry is configurable by the processing circuitry to implement a plurality of multiplexing algorithms, the PHY circuitry to select the multiplexing algorithm from the plurality of multiplexing algorithms prior to determining the multiplexed data stream.

4. The PHY device of claim 1, wherein implementing the multiplexing algorithm includes alternating symbols of the plurality of data flows on the multiplexed data stream.

5. The PHY device of claim 1, wherein a link speed associated with the data link at the second I/O is substantially equal to a sum of speeds associated with respective ones of the plurality of data flows.

6. The PHY device of claim 1, wherein the PHY device corresponds to a retimer device and the PHY circuitry corresponds to the retimer circuitry, the PHY device further including:
- a plurality of serializer/deserializer (SerDes) circuitries, respective ones of the SerDes circuitries to access respective ones of the plurality of data flows from the plurality of ports, and to output, based on the respective ones of the plurality of data flows, respective SerDes output data flows; and
- a plurality of physical coding sublayer (PCS) and forward error correction (FEC) (PCS/FEC) circuitries, respective ones of the PCS/FEC circuitries to access respective ones of the SerDes output data flows, and to output, based on the respective ones of the SerDes output data flows, respective PCS/FEC output data flows, the respective ones of the PCS/FEC circuitries having respective speeds substantially equal to respective speeds of the respective ones of the SerDes circuitries and to respective speeds of the respective ones of the plurality of data flows.

7. The PHY device of claim 6, further including a port extender device, the port extender device to determine the multiplexed data stream by implementing the multiplexing algorithm, the port extender device to access the PCS/FEC output data flows, and to multiplex the PCS/FEC output data flows to generate a port extender multiplexed data flow therefrom at an output thereof, the port extender multiplexed data flow corresponding to the multiplexed data stream.

8. A switch system of a computing network, the switch system including:
- a retimer device having a first physical retimer input/output (I/O), and a second physical retimer (I/O), and retimer circuitry coupled between the first retimer I/O and the second retimer I/O, the retimer circuitry to:
- implement a plurality of retimer ports at the first retimer I/O, and a data link at the second retimer I/O;
  - access a plurality of retimer data flows from the plurality of retimer ports at the first retimer I/O;
  - determine a multiplexed data stream from the plurality of retimer data flows by implementing a multiplexing algorithm; and
  - send the multiplexed data stream for transmission from the data link at the second retimer I/O; and
- a switch device coupled to the retimer device by way of the data link, the switch device having a first physical switch input/output (I/O), and a second physical switch (I/O), and switch circuitry coupled between the first switch I/O and the second switch I/O, the switch circuitry to:
  - implement the data link at the second switch I/O and a plurality of switch ports at the first switch I/O;
  - access the multiplexed data stream at the data link;

determine a plurality of switch data flows from the multiplexed data stream by implementing a demultiplexing algorithm, the demultiplexing algorithm based on the multiplexing algorithm, the plurality of switch data flows corresponding to a demultiplexing of the plurality of retimer data flows from the multiplexed data stream; and send respective ones of the plurality of switch data flows for transmission from respective ones of the plurality of switch ports at the first switch I/O.

9. The switch system of claim 8, wherein the retimer circuitry is configurable, by a processing circuitry coupled to the retimer circuitry, to the multiplexing algorithm, and wherein the switch circuitry is configurable, by the processing circuitry, to the demultiplexing algorithm.

10. The switch system of claim 8, wherein implementing the multiplexing algorithm includes alternating odd and even symbols of the plurality of data flows on the multiplexed data stream.

11. The switch system of claim 8, the retimer device further including:

a plurality of retimer serializer/deserializer (SerDes) circuitries, respective ones of the retimer SerDes circuitries to access respective ones of the plurality of retimer data flows from the plurality of retimer ports, and to output, based on the respective ones of the plurality of retimer data flows, respective retimer SerDes output data flows; and a plurality of retimer physical coding sublayer (PCS) and forward error correction (FEC) (PCS/FEC) circuitries, respective ones of the retimer PCS/FEC circuitries to access respective ones of the retimer SerDes output data flows, and to output, based on the respective ones of the retimer SerDes output data flows, respective retimer PCS/FEC output data flows that include only PCS symbols, wherein the respective ones of the retimer PCS/FEC circuitries have respective speeds substantially equal to respective speeds of the respective ones of the retimer SerDes circuitries and to respective speeds of the respective ones of the plurality of retimer data flows.

12. The switch system of claim 11, the retimer device further including a retimer port extender device, the retimer port extender device to determine the multiplexed data stream by implementing the multiplexing algorithm, the retimer port extender device to access the retimer PCS/FEC output data flows, and to multiplex the retimer PCS/FEC output data flows to generate a retimer port extender multiplexed data flow therefrom at an output thereof, the retimer port extender multiplexed data flow corresponding to the multiplexed data stream.

13. The switch system of claim 11, wherein the retimer PCS/FEC circuitries are to remove alignment markers from the respective ones of the retimer SerDes output data flows.

14. The switch system of claim 8, the switch device further including:

a switch serializer/deserializer (SerDes) circuitry to access the multiplexed data flow on the data link, and to generate a switch SerDes output data flow therefrom, the switch SerDes output data flow corresponding to the multiplexed data stream;

a switch PCS/FEC circuitry, the switch PCS/FEC circuitry to access the switch SerDes output data flow, and to generate a switch PCS/FEC output data flow at an output thereof, the switch PCS/FEC output data flow corresponding to the multiplexed data stream; and a switch port extender device, the switch port extender device to access the switch PCS/FEC output data flow and to implement the demultiplexing algorithm thereon to generate a plurality of switch port extender data flows at an output thereof.

15. The switch system of claim 14, the switch device further including a plurality of MAC circuitries, respective ones of the MAC circuitries to access respective ones of the plurality of switch port extender data flows, and to output, based on the respective ones of the plurality of switch port extender data flows, respective MAC output data flows.

16. One or more tangible non-transitory machine readable storage media storing instructions that, when executed at a PHY device including one of a retimer circuitry or a switch circuitry of a computing network switch system, causes the PHY device to perform operations including:

implementing a plurality of ports at a first I/O of the PHY device, and a data link at a second I/O of the PHY device;

accessing a plurality of data flows from the plurality of ports at the first I/O;

determining a multiplexed data stream from the plurality of data flows by implementing a multiplexing algorithm; and sending the multiplexed data stream for transmission from the data link at the second I/O.

17. The storage media of claim 16, the operations further including configuring the PHY device to the multiplexing algorithm.

18. The storage media of claim 17, configuring the PHY circuitry to a plurality of multiplexing algorithms, and selecting the multiplexing algorithm from the plurality of multiplexing algorithms prior to determining the multiplexed data stream.

19. The storage media of claim 16, wherein a link speed associated with the data link at the second I/O is substantially equal to a sum of speeds associated with respective ones of the plurality of data flows.

20. The storage media of claim 16, wherein the PHY device corresponds to a switch device, and the PHY circuitry corresponds to the switch circuitry, the operations further including accessing, at respective ones of MAC circuitries of the PHY device, respective ones of the plurality of data flows from the plurality of ports, and outputting, based on the respective ones of the plurality of data flows, respective MAC output data flows.

21. A method to be performed at a physical layer (PHY) circuitry of a PHY device of a computing network switch system, the PHY circuitry including one of a retimer circuitry or a switch circuitry, the method including:

implementing a plurality of ports at a first I/O of the PHY device, and a data link at a second I/O of the PHY device;

accessing a plurality of data flows from the plurality of ports at the first I/O;

determining a multiplexed data stream from the plurality of data flows by implementing a multiplexing algorithm; and sending the multiplexed data stream for transmission from the data link at the second I/O.

22. The method of claim 21, further including configuring the PHY circuitry to the multiplexing algorithm.

23. The method of claim 21, wherein implementing the multiplexing algorithm includes alternating symbols of the plurality of data flows on the multiplexed data stream.

24. The method of claim 21, wherein a link speed associated with the data link at the second I/O is substantially equal to a sum of speeds associated with respective ones of the plurality of data flows.

25. The method of claim 21, wherein the PHY device corresponds to a retimer device, and the PHY circuitry corresponds to the retimer circuitry, the method further including accessing, at a serializer and deserializer (SerDes) circuitry of the PHY device, respective ones of the plurality of data flows from the plurality of ports, and outputting from the SerDes circuitry, based on the respective ones of the plurality of data flows, respective SerDes output data flows.

* * * * *